US012775864B2

(12) United States Patent
Sutherland

(10) Patent No.: US 12,775,864 B2
(45) Date of Patent: Oct. 27, 2026

(54) LASER-FREE SINGLE QUBIT GATE

(71) Applicant: Quantinuum LLC, Broomfield, CO (US)

(72) Inventor: Robert Tyler Sutherland, San Antonio, TX (US)

(73) Assignee: Quantinuum LLC, Broomfield, CO (US)

( * ) Notice: Subject to any disclaimer, the term of this patent is extended or adjusted under 35 U.S.C. 154(b) by 132 days.

(21) Appl. No.: 18/806,812

(22) Filed: Aug. 16, 2024

(65) Prior Publication Data

US 2026/0057274 A1 Feb. 26, 2026

Related U.S. Application Data

(60) Provisional application No. 63/581,019, filed on Sep. 7, 2023.

(51) Int. Cl.

*G06N 10/40* (2022.01)
*G06N 10/20* (2022.01)
*G21K 1/00* (2026.01)

(52) U.S. Cl.

CPC ............ *G06N 10/40* (2022.01); *G06N 10/20* (2022.01); *G21K 1/00* (2013.01)

(58) Field of Classification Search

CPC ........... G06N 10/40; G06N 10/20; G21K 1/00
USPC ............................ 326/1, 7; 706/62; 714/820
See application file for complete search history.

(56) References Cited

FOREIGN PATENT DOCUMENTS

WO WO-2025226318 A2 * 10/2025 ............ G06N 10/60

OTHER PUBLICATIONS

Weidt, S., et al., “Trapped-ion quantum logic with global radiation fields”, submitted to Cornell University Online Library Archive on Jun. 9, 2016, retrieved from the Internet at https://arxiv.org/pdf/1603.03384v2 on Sep. 20, 2024, 12 pages. (Published in Physical Review Letters vol. 117, No. 220501, on Nov. 23, 2016.).

Cohen, I., et al., “Multi-qubit gate with trapped ions for microwave and laser-based implementation”, New Journal of Physics, Apr. 8, 2015, 12 pages, vol. 17, No. 043008, Institute of Physics Publishing, GB.

Outgoing—ISA/210—International Search Report Mailed on May 12, 2025 for WO Application No. PCT/US24/045122, 4 page(s).

(Continued)

*Primary Examiner* — Arnold M Kinkead
(74) *Attorney, Agent, or Firm* — Alston & Bird LLP

(57) ABSTRACT

A controller of a quantum system causes performance of a single qubit gate on a target qubit. The controller causes a dressing field circuit to generate a dressing field at a target location where the target qubit is located. The dressing field modifies a set of initial states into a set of superposition states. A first (second) dressed state of the set of superposition states includes a non-zero contribution from a first (second) qubit state of the set of initial states. A dressed frequency difference between the first and second dressed states and a qubit frequency difference between the first and second qubit states are different. The controller causes a gate microwave signal characterized by the dressed frequency difference plus the qubit frequency difference to be incident on the target location. After a gate time, the controller controls operation of the dressing field circuit to stop generating the dressing field.

20 Claims, 7 Drawing Sheets

(56) References Cited

OTHER PUBLICATIONS

Figure 1:
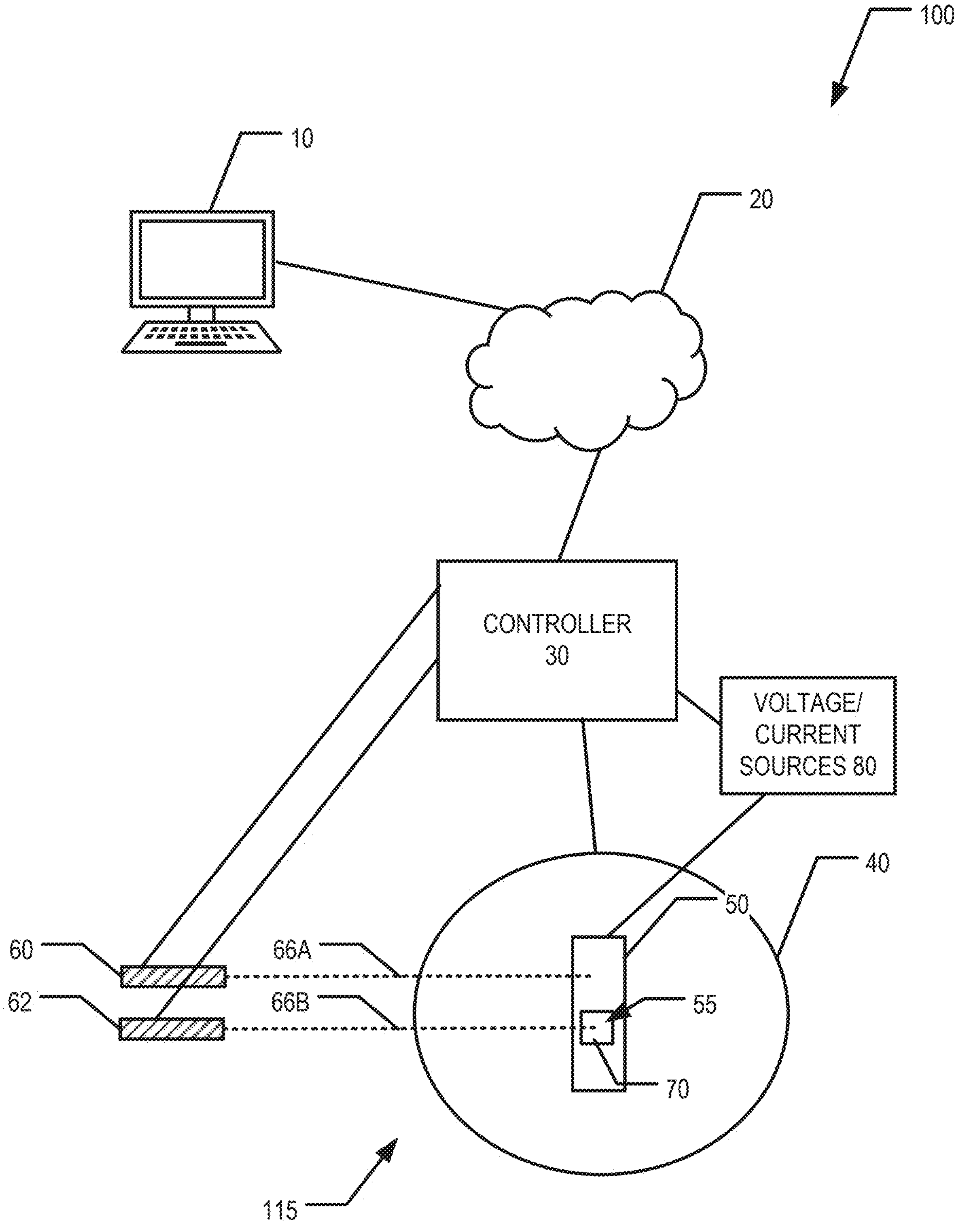

Outgoing Written Opinion of the ISA Mailed on May 12, 2025 for WO Application No. PCT/US24/045122, 10 page (s).

Timoney, N., et al., "Letter: Quantum gates and memory using microwave-dressed states", Nature, Aug. 11, 2011, pp. 185-189, vol. 476, Macmillan Publishers Limited, EN.

U.S. Utility Provisional Application for "Confinement Apparatus System with Integrated Ferromagnetic Structures", unpublished (Filed Jun. 20, 2023), Timothy Peterson (Inventor), Quantinuum LLC (Applicant), U.S. Appl. No. 63/509,098.

U.S. Utility Provisional Application for "Hybrid Architecture for Quantum Object Confinement Apparatus", unpublished (Filed May 30, 2023), David L. Hayes (Inventor), Quantinuum LLC (Applicant), U.S. Appl. No. 63/504,808.

U.S. Utility Provisional Application for "Junction Caching for Quantum Processing Unit Memory Hierarchy", unpublished (filed Dec. 20, 2022), Ian Hoffman (Inventor), Quantinuum LLC (Applicant), U.S. Appl. No. 63/476,226.

* cited by examiner

LASER-FREE SINGLE QUBIT GATE

CROSS-REFERENCE TO RELATED APPLICATIONS

This application claims priority to U.S. Application No. 63/581,019, filed Sep. 7, 2023, the content of which is incorporated herein by reference in its entirety.

TECHNICAL FIELD

Various embodiments relate to a quantum logic gate using a microwave gate signal. Various embodiments relate to a quantum logic gate that uses a microwave dressing field to frequency select qubits for performance of quantum logic gates using microwave gate signals.

BACKGROUND

Quantum computing uses quantum interactions to perform quantum computations. An example quantum interaction is the performance of a quantum logic gate, such as a single qubit gate, on a qubit. For example, a quantum logic gate may be used to cause a controlled evolution of the quantum state of a qubit. Conventionally, performance of a single qubit gate includes the application of one or more laser beams or microwaves on the qubit being gated. However, the laser beams can lead to photon scattering and/or introduce phase noise during the performance of a conventional single qubit gate, leading to reduced gate fidelity. Microwaves are not able to be focused on target qubits the way laser beams can, which can result in undesired rotations of qubits near the target qubit (e.g., crosstalk). Through applied effort, ingenuity, and innovation many deficiencies of such conventional quantum logic gates have been solved by developing solutions that are structured in accordance with the embodiments of the present invention, many examples of which are described in detail herein.

BRIEF SUMMARY OF EXAMPLE EMBODIMENTS

Example embodiments provide quantum systems, controllers of quantum systems, and corresponding methods for performing a single qubit quantum logic gate (also referred to as a single qubit gate herein). Various embodiments provide methods for performing single qubit gates without the use of lasers and quantum systems and controllers of quantum systems configured for performing such methods.

In various embodiments, a qubit has an initial set of quantum states. The initial set of quantum states includes a first qubit state and a second qubit state of a qubit sub-space of the initial set of quantum states. In various embodiments, performing a single qubit gate includes causing a dressing field to be present at a target location defined at least in part by the confinement apparatus. The dressing field interacts with a qubit disposed at the target location to cause the quantum states of the qubit to be dressed and/or modified to provide a set of superposition states. Each dressed state of the set of superposition states is a superposition of two or more quantum states of the initial set of quantum states. The set of superposition states includes a first dressed state that includes a non-zero contribution from the first qubit state and a second dressed state that includes a non-zero contribution from the second qubit state. The frequency difference between the first dressed state and the second dressed state (referred to herein as a dressed frequency difference) is different than the frequency difference between the first qubit state and the second qubit state (referred to herein as an qubit frequency difference).

Performing the single qubit gate further includes causing a gate microwave signal to be incident on the qubit disposed at the target location, in various embodiments. The gate microwave signal is tuned to and/or resonant with the dressed frequency difference plus the hyperfine splitting of the qubit. As a result, the gate microwave signal is off resonant to the qubits not located at the target location (e.g., since the dressed frequency difference is different from the 'idle' or undressed qubit frequency difference. Thus, a single qubit gate is performed on the qubit disposed at the target location and undesired rotations of qubits located outside of the target location are prevented.

For example, in an example embodiment, performing a single qubit gate on a target qubit confined at a target location defined at least in part by a confinement apparatus includes a controller configured to control various components of a quantum system including the confinement apparatus controlling operation of a dressing field circuit to cause the dressing field circuit to generate a dressing field at the target location. The dressing field is configured to modify an energy structure of the target qubit disposed at the target location by causing a set of initial states of the qubit to form a set of superposition states. A first dressed state of the set of superposition states includes a non-zero contribution from a first qubit state of the set of initial states and a second dressed state of the set of superposition states includes a non-zero contribution from a second qubit state of the set of initial states. A dressed frequency difference between the first dressed state and the second dressed state is different from an 'idle' or undressed qubit frequency difference between the first qubit state and the second qubit state. The controller controls a microwave source to cause a gate microwave signal to be incident on the target location for a gate time. The gate microwave signal is characterized by the dressed frequency difference plus the frequency difference of the hyperfine manifold of the qubit. After the gate microwave signal is incident on the target location for a gate time, the controller controls operation of the dressing field circuit to cause the dressing field circuit to stop generating the dressing field at the target location.

According to one aspect, a method for performing a single qubit gate on a target qubit confined by a confinement apparatus is provided. In an example embodiment, the method includes controlling, by a controller, operation of a dressing field circuit to cause the dressing field circuit to generate a dressing field at a target location defined at least in part by the confinement apparatus. The dressing field is configured to modify an energy structure of a target qubit disposed at the target location by causing a set of initial states of the target qubit to form a set of superposition states. A first dressed state of the set of superposition states includes a non-zero contribution from a first qubit state of the set of initial states and a second dressed state of the set of superposition states includes a non-zero contribution from a second qubit state of the set of initial states. A dressed frequency difference between the first dressed state and the second dressed state is different from a qubit frequency difference between the first qubit state and the second qubit state. The method further includes controlling, by the controller, a microwave source to cause a gate microwave signal to be incident on the target location for a gate time. The gate microwave signal is characterized by the dressed frequency difference plus the hyperfine frequency difference of the qubit. The method further includes, after completion of the gate time, controlling, by the controller, operation of the dressing field circuit to cause the dressing field circuit to stop generating the dressing field at the target location.

In an example embodiment, the operation of the dressing field circuit is controlled such that when the dressing field circuit starts generating the dressing field, an amplitude of the dressing field increases from zero to a dressing amplitude over a time period that is longer than a reciprocal of the dressed frequency difference.

In an example embodiment, the operation of the dressing field circuit is controlled such that when the dressing field circuit stops generating the dressing field, an amplitude of the dressing field decreases from a dressing amplitude to zero over a time period that is longer than a reciprocal of the dressed frequency difference.

In an example embodiment, the operation of the dressing field circuit is controlled such that the dressing field is turned on and turned off adiabatically.

In an example embodiment, controlling operation of the dressing field circuit comprises controlling operation of a current source or voltage source configured to provide a respective one of current or voltage to the dressing field circuit.

In an example embodiment, the dressing field is a microwave field.

In an example embodiment, the dressing field circuit is disposed on the confinement apparatus.

In an example embodiment, the dressing field circuit is lithographically printed on a surface of the confinement apparatus.

In an example embodiment, a frequency difference between the dressed frequency difference and the qubit frequency difference is in a range of 0.1 to 20 MHz.

In an example embodiment, the dressing field is configured to only cause trackable AC Zeeman shifts on one or more additional qubits confined by the confinement apparatus and disposed outside of the target location.

In an example embodiment, the method further includes storing, to a classical memory of the controller, information regarding an AC Zeeman shift imparted to the one or more additional qubits by the dressing field.

In an example embodiment, (a) the gate microwave signal is incident on the target location with a gate amplitude, (b) while the gate microwave signal is incident on the target location, the dressing field has a dressing amplitude, and (c) the dressing amplitude is larger than the gate amplitude.

According to another aspect, a system is provided. The system is configured to perform a single qubit gate on a target qubit. The system includes a confinement apparatus configured to confine one or more qubits (the one or more qubits including the target qubit); a dressing field circuit, the dressing field circuit and the confinement apparatus defining, at least in part, a target location; a microwave source configured to generate a gate microwave signal; and a controller configured to control operation of the dressing field circuit and the microwave source. The controller is configured to control operation of the dressing field circuit and the microwave source to cause the single qubit gate to be performed on the target qubit located at the target location by performing controlling operation of the dressing field circuit to cause the dressing field circuit to generate a dressing field at the target location. The dressing field is configured to modify an energy structure of the target qubit disposed at the target location by causing a set of initial states of the target qubit to form a set of superposition states. A first dressed state of the set of superposition states includes a non-zero contribution from a first qubit state of the set of initial states and a second dressed state of the set of superposition states includes a non-zero contribution from a second qubit state of the set of initial states. A dressed frequency difference between the first dressed state and the second dressed state is different from a qubit frequency difference between the first qubit state and the second qubit state. The controller is configured to control operation of the dressing field circuit and the microwave source to cause the single qubit gate to be performed on the target qubit located at the target location by further performing controlling the microwave source to cause the gate microwave signal to be incident on the target location for a gate time, wherein the gate microwave signal is characterized by the dressed frequency difference plus the hyperfine frequency difference of the qubit; and, after completion of the gate time, controlling operation of the dressing field circuit to cause the dressing field circuit to stop generating the dressing field at the target location.

In an example embodiment, the operation of the dressing field circuit is controlled such that when the dressing field circuit starts generating the dressing field, an amplitude of the dressing field increases from zero to a dressing amplitude over a time period that is longer than a reciprocal of the dressed frequency difference.

In an example embodiment, the operation of the dressing field circuit is controlled such that when the dressing field circuit stops generating the dressing field, an amplitude of the dressing field decreases from a dressing amplitude to zero over a time period that is longer than a reciprocal of the dressed frequency difference.

In an example embodiment, the operation of the dressing field circuit is controlled such that the dressing field is turned on and turned off adiabatically.

In an example embodiment, the system further includes at least one of a current source or voltage source configured to provide a respective one of current or voltage to the dressing field circuit and controlling operation of the dressing field circuit comprises controlling operation of the at least one of the current source or the voltage source.

In an example embodiment, the dressing field is a microwave field.

In an example embodiment, the dressing field circuit is disposed on the confinement apparatus.

In an example embodiment, the dressing field circuit is lithographically printed on a surface of the confinement apparatus.

In an example embodiment, a frequency difference between the dressed frequency difference and the qubit frequency difference is in a range of 0.1 to 20 MHz.

In an example embodiment, the dressing field is configured to only cause trackable AC Zeeman shifts on one or more additional qubits confined by the confinement apparatus and disposed outside of the target location.

In an example embodiment, the controller is further configured to perform storing, to a classical memory of the controller, information regarding an AC Zeeman shift imparted to the one or more additional qubits by the dressing field.

In an example embodiment, (a) the gate microwave signal is incident on the target location with a gate amplitude, (b) while the gate microwave signal is incident on the target location, the dressing field has a dressing amplitude, and (c) the dressing amplitude is larger than the gate amplitude.

According to another aspect, a controller configured to control one or more components of a quantum system and configured to cause the quantum system to perform a single qubit gate is provided. In an example embodiment, the controller comprises a processing device, memory storing executable instructions, and driver controller elements. The executable instructions are configured to, when executed by the processing device, cause the controller to use the driver controller elements to control operation of a dressing field circuit to cause a dressing field circuit to generate a dressing field at a target location defined at least in part by a confinement apparatus of the quantum system. The dressing field is configured to modify an energy structure of the target qubit disposed at the target location by causing a set of initial states of the target qubit to form a set of superposition states. A first dressed state of the set of superposition states includes a non-zero contribution from a first qubit state of the set of initial states and a second dressed state of the set of superposition states includes a non-zero contribution from a second qubit state of the set of initial states. A dressed frequency difference between the first dressed state and the second dressed state is different from a qubit frequency difference between the first qubit state and the second qubit state. The executable instructions are further configured to, when executed by the processing device, cause the controller to use the driver controller elements to control operation of a microwave source to cause a gate microwave signal to be incident on the target location for a gate time, wherein the gate microwave signal is characterized by the dressed frequency difference; and after completion of the gate time, control operation of the dressing field circuit to cause the dressing field circuit to stop generating the dressing field at the target location.

In an example embodiment, the operation of the dressing field circuit is controlled such that when the dressing field circuit starts generating the dressing field, an amplitude of the dressing field increases from zero to a dressing amplitude over a time period that is longer than a reciprocal of the dressed frequency difference.

In an example embodiment, the operation of the dressing field circuit is controlled such that when the dressing field circuit stops generating the dressing field, an amplitude of the dressing field decreases from a dressing amplitude to zero over a time period that is longer than a reciprocal of the dressed frequency difference.

In an example embodiment, the operation of the dressing field circuit is controlled such that the dressing field is turned on and turned off adiabatically.

In an example embodiment, to control operation of the dressing field circuit, the executable instructions are configured to, when executed by the processing device, cause the controller to use the driver controller elements to control operation of at least one of a current source or voltage source configured to provide a respective one of current or voltage to the dressing field circuit to cause the at least one of the current source or the voltage source to provide the respective one of current or voltage to the dressing field circuit.

In an example embodiment, the dressing field is a microwave field.

In an example embodiment, the dressing field circuit is disposed on the confinement apparatus.

In an example embodiment, the dressing field circuit is lithographically printed on a surface of the confinement apparatus.

In an example embodiment, a frequency difference between the dressed frequency difference and the qubit frequency difference is in a range of 0.1 to 20 MHz.

In an example embodiment, the dressing field is configured to only cause trackable AC Zeeman shifts on one or more additional qubits confined by the confinement apparatus and disposed outside of the target location.

In an example embodiment, the executable instructions are configured to, when executed by the processing device, cause the controller to store, to the memory, information regarding an AC Zeeman shift imparted to the one or more additional qubits by the dressing field.

In an example embodiment, (a) the gate microwave signal is incident on the target location with a gate amplitude, (b) while the gate microwave signal is incident on the target location, the dressing field has a dressing amplitude, and (c) the dressing amplitude is larger than the gate amplitude.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a block diagram of an example quantum charge-coupled device (QCCD)-based quantum system, in accordance with an example embodiment.

Figure 2:
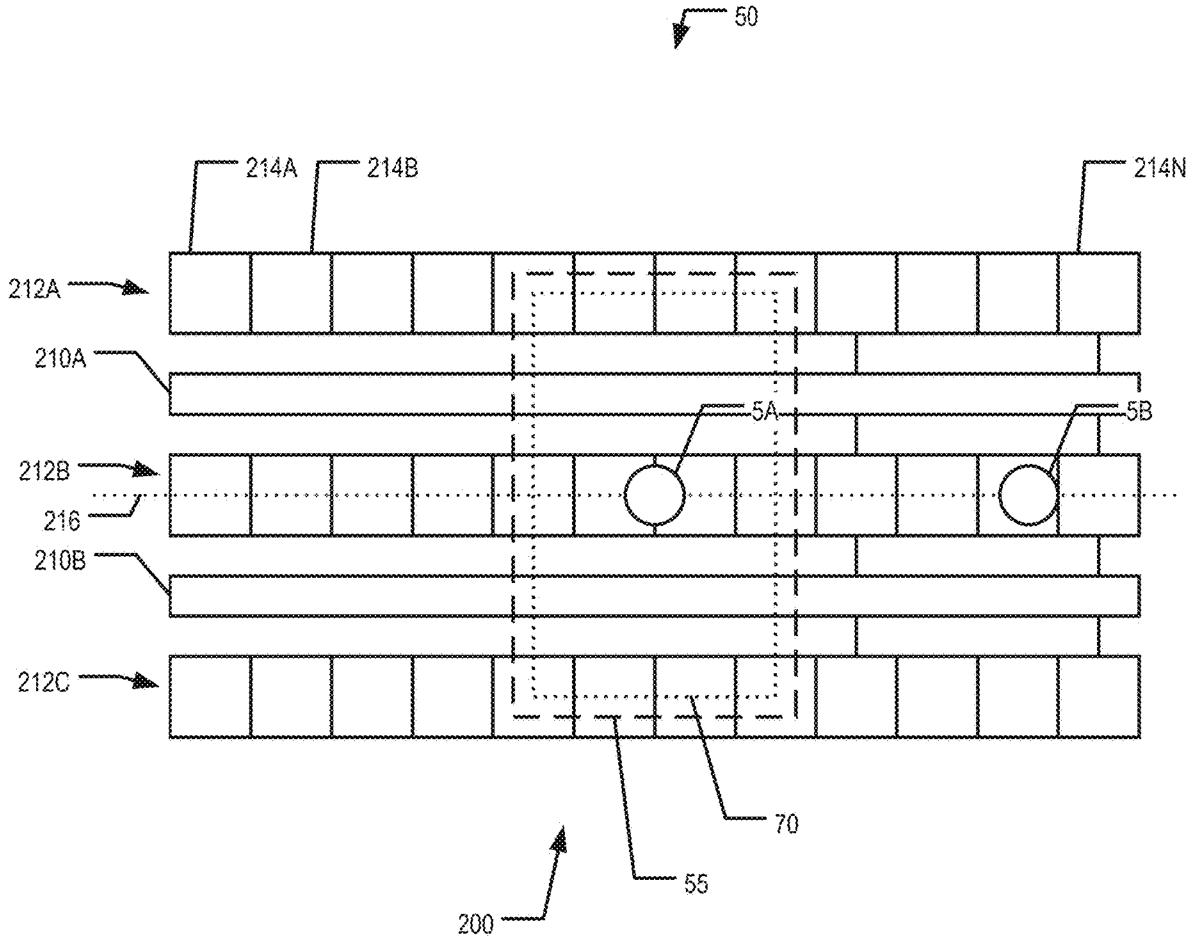

FIG. 2 provides a schematic diagram of a top view of an example confinement region of a confinement apparatus that includes a target location, in accordance with an example embodiment.

Figure 3:
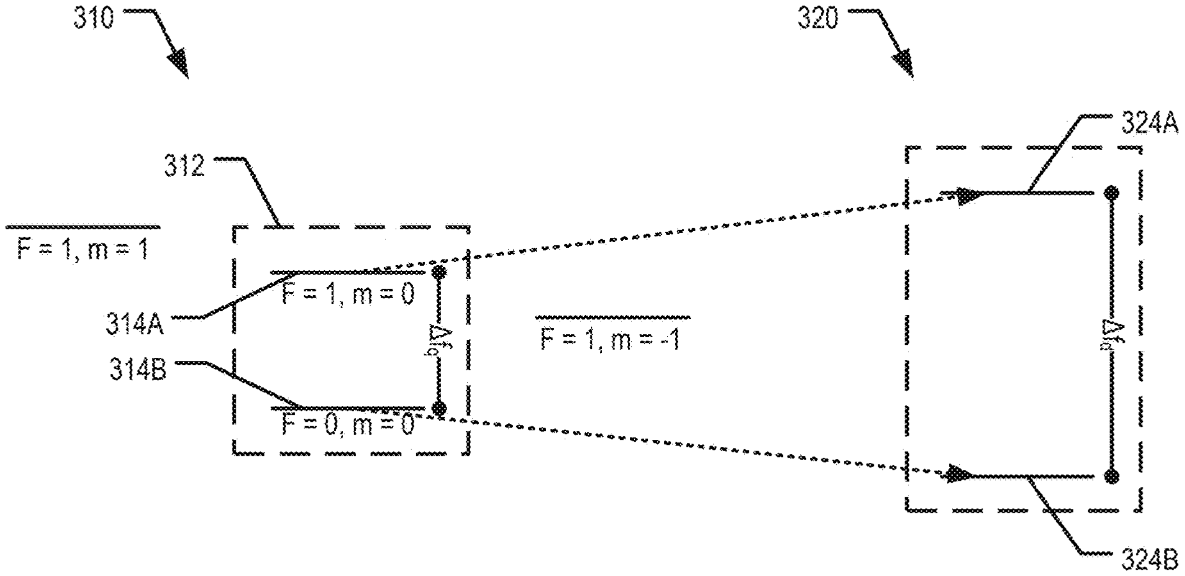

FIG. 3 provides a schematic diagram of an example set of initial states and an example set of superposition states, in accordance with an example embodiment.

Figure 4A:
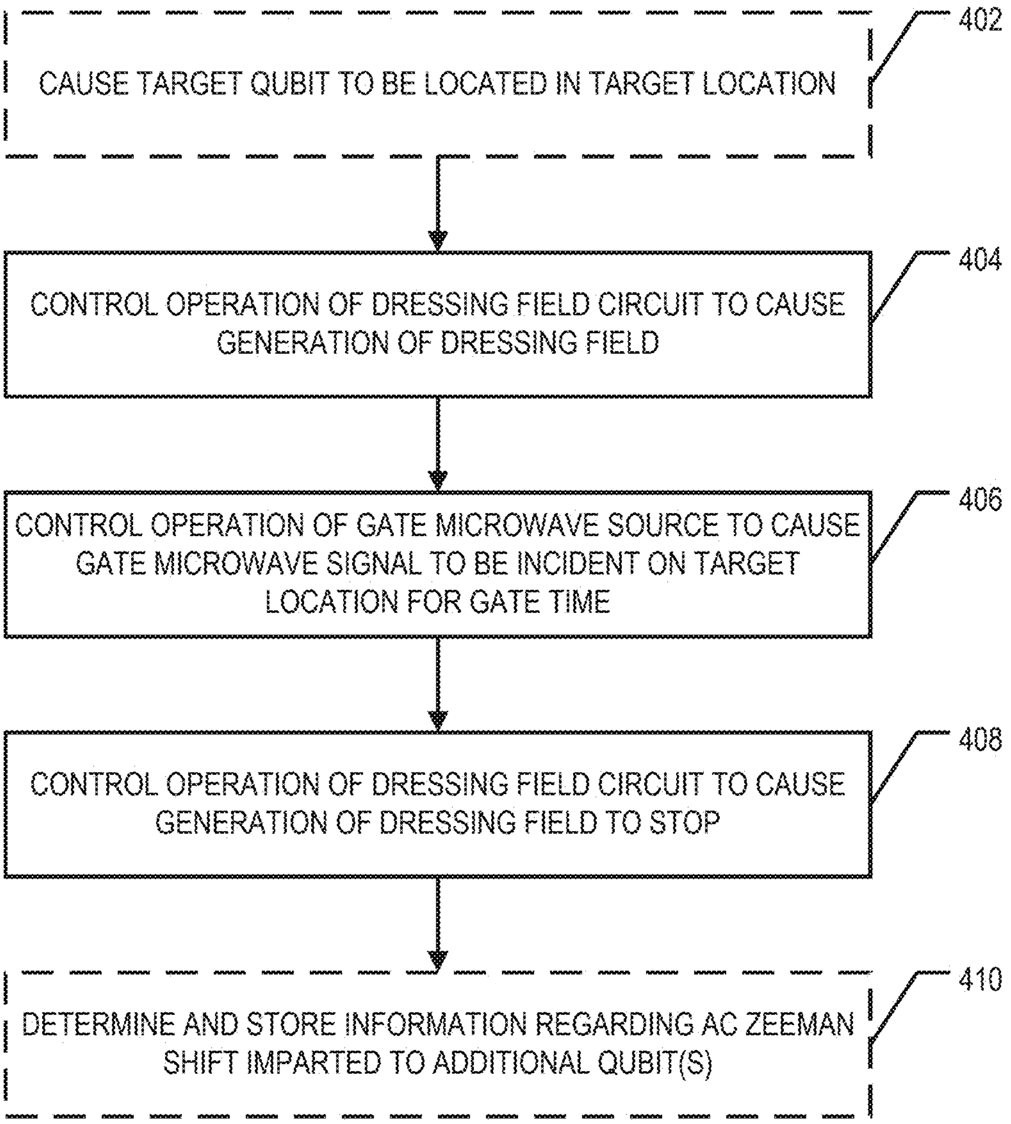

FIG. 4A provides flowchart illustrating processes, procedures, and/or operations for performing a single qubit gate, in accordance with an example embodiment.

Figure 4B:
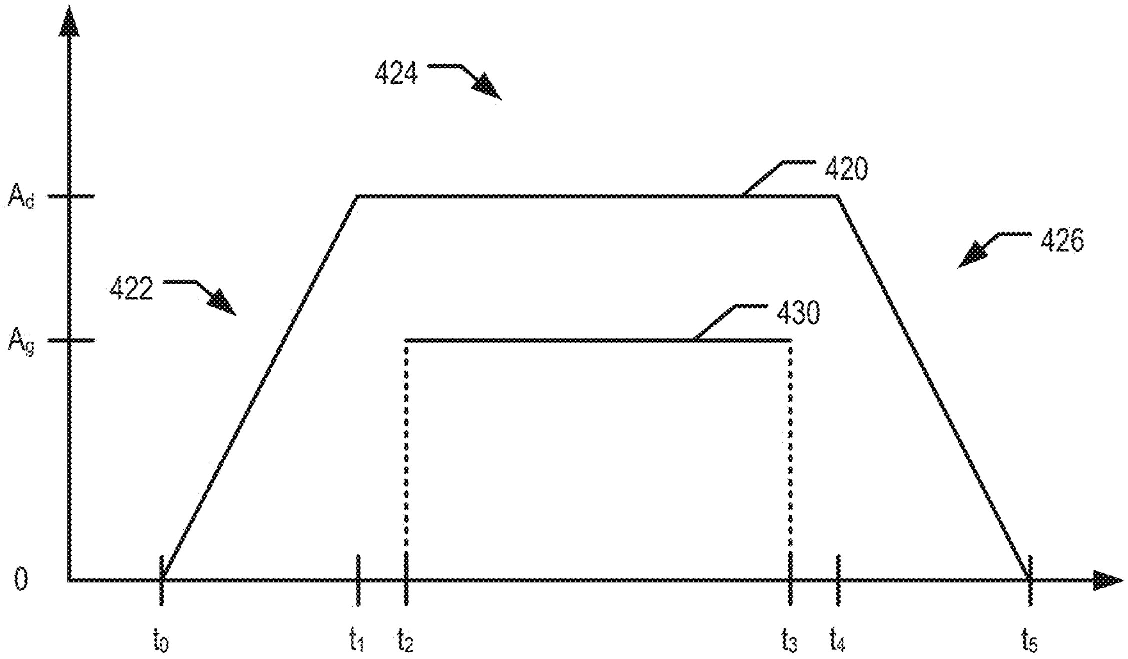

FIG. 4B provides a diagram illustrating the amplitude or intensity of a dressing field and a gate microwave signal over time during performance of a single qubit gate, in accordance with an example embodiment.

Figure 5:
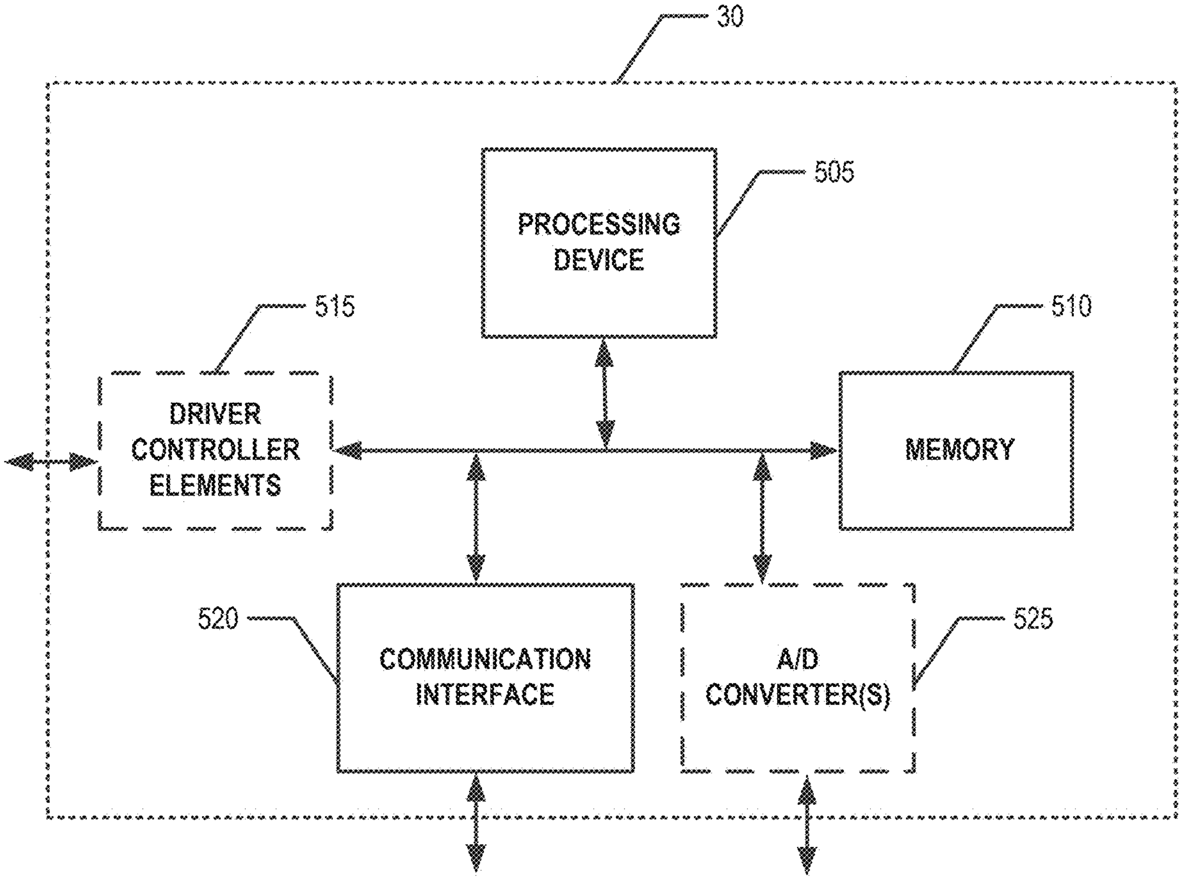

FIG. 5 provides a schematic diagram of an example controller of a quantum system, in accordance with an example embodiment.

Figure 6:
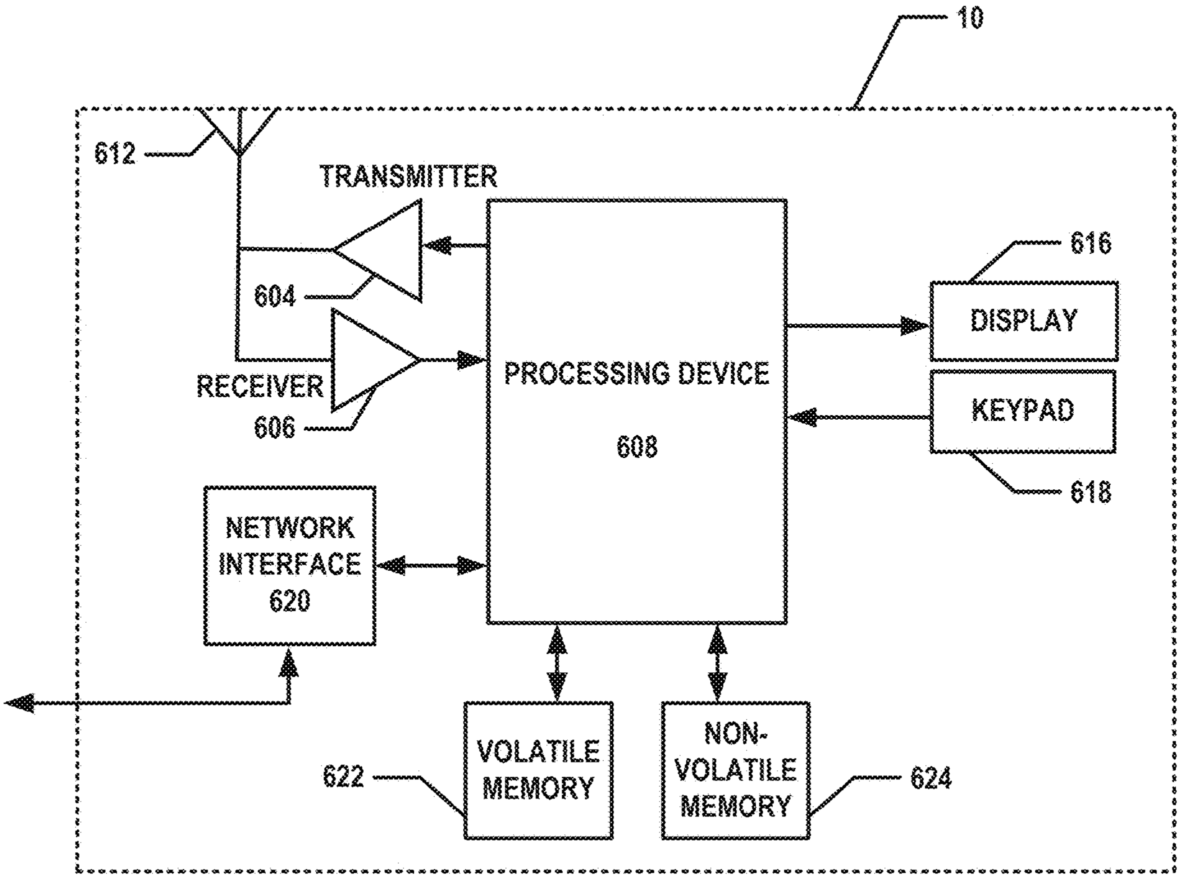

FIG. 6 provides a schematic diagram of an example computing entity of a quantum system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term “or” (also denoted “/”) is used herein in both the alternative and conjunctive sense, unless otherwise indicated. The terms “illustrative” and “exemplary” are used to be examples with no indication of quality level. The terms “generally” and “approximately” refer to within appropriate engineering and/or manufacturing limits and/or within user measurement capabilities, unless otherwise indicated. Like numbers refer to like elements throughout.

Example embodiments provide quantum systems, controllers of quantum systems, and corresponding methods for performing a single qubit quantum logic gate (also referred to as a single qubit gate herein). Various embodiments provide methods for performing single qubit gates without the use of lasers and quantum systems and controllers of quantum systems configured for performing such methods.

In various embodiments, a qubit has an initial set of quantum states. The initial set of quantum states includes a first qubit state and a second qubit state of a qubit sub-space of the initial set of quantum states. In various embodiments, performing a single qubit gate includes causing a dressing field to be present at a target location defined at least in part by the confinement apparatus. The dressing field interacts with a qubit disposed at the target location to cause the quantum states of the qubit to be dressed and/or modified to provide a set of superposition states. Each dressed state of the set of superposition states is a superposition of two or more quantum states of the initial set of quantum states. The set of superposition states includes a first dressed state that includes a non-zero contribution from the first qubit state and a second dressed state that includes a non-zero contribution from the second qubit state. The frequency difference between the first dressed state and the second dressed state (referred to herein as a dressed frequency difference) is different than the frequency difference between the first qubit state and the second qubit state (referred to herein as an qubit frequency difference).

Performing the single qubit gate further includes causing a gate microwave signal to be incident on the qubit disposed at the target location, in various embodiments. The gate microwave signal is tuned to and/or resonant with the dressed frequency difference plus the hyperfine splitting of the qubit (e.g., plus the qubit frequency difference). As a result, the gate microwave signal is off resonant to the qubits not located at the target location (e.g., since the frequency of the microwave signal is off resonant from the qubit frequency difference). Thus, a single qubit gate is performed on the qubit disposed at the target location and undesired rotations of qubits located outside of the target location are prevented.

From the perspective of the target qubit, the dressing field is turned on and off slowly such that the energy structure of the target qubit is dressed and/or modified from the set of initial states to the set of superposition states adiabatically. As used herein, the term "slowly" relates to the dressing field being turned on (for performance of the single qubit gate) and/or turned off (after performance of the single qubit gate) at a time scale that is slow compared to the dressed frequency difference. For example, the time that elapses while the dressing field is turned on from a zero-amplitude to a dressing amplitude and the time that elapses while the dressing field is turned off from the dressing amplitude to a zero-amplitude are each longer than one over the dressed frequency difference (e.g., greater than the reciprocal of the dressed frequency difference).

Conventionally, performance of a single qubit gate includes the application of one or more laser beams or microwaves on the qubit being gated. However, the laser beams can lead to photon scattering and/or introduce phase noise during the performance of a conventional single qubit gate, leading to reduced gate fidelity. Microwaves are not able to be focused on target qubits the way laser beams can, which can result in undesired rotations of qubits near the target qubit (e.g., crosstalk). In order to perform single qubit gates on qubits using microwaves (e.g., not using lasers), it is important to perform the gate in a manner that prevents crosstalk such that the single qubit gate only affects the target qubit(s). Various forms of frequency selection of qubits for performance of single qubit gates using microwaves have been proposed. However, these each have various technical challenges relating to scalability. Therefore, technical problems exist regarding how to perform single qubit gates that do not negatively impact qubits that are not the target qubit (e.g., that are not intended to be acted on by the single qubit gate).

Various embodiments provide technical solutions to these technical problems. In various embodiments, a dressing field is generated at a target location such that the energy structure of a target qubit located at the target location is modified and/or dressed by the dressing field. Prior to experiencing the dressing field, the energy structure of the target qubit includes a set of initial states including a first qubit state and a second qubit state. While experiencing the dressing field, the dressed energy structure of the target qubit includes a set of super position states. The set of superposition states includes a first dressed state that includes a non-zero contribution from the first qubit state and a second dressed state that includes a non-zero contribution from the second qubit state. The dressed frequency difference between the first dressed state and the second dressed state is different than the qubit frequency difference between the first qubit state and the second qubit state. The gate microwave signal used to perform the single qubit gate is tuned to and/or resonant with the dressed frequency difference plus the hyperfine splitting of the qubit (e.g., plus the qubit frequency difference). As a result, the gate microwave signal causes the single qubit gate to be performed on the target qubit and the gate microwave signal is off resonant to the qubits not located at the target location (e.g., since the frequency of the microwave signal is off resonant from the qubit frequency difference). Thus, a single qubit gate is performed on the target qubit disposed at the target location and undesired rotations of qubits located outside of the target location are prevented. Therefore, various embodiments provide technical improvements to the fields of quantum computing, performance of single qubit gates, and controlled quantum state evolution of a qubit (e.g., a quantum object).

Example QCCD-Based Quantum System

An example system that may be configured to perform a single qubit gate in accordance with various embodiments is a quantum charge-coupled device (QCCD)-based quantum system. FIG. 1 provides a schematic diagram of an example QCCD-based quantum system 100 that can be used to perform a quantum logic gate of various embodiments. The example QCCD-based quantum system 100 shown in FIG. 1 is a quantum computer system comprising a confinement apparatus 50 defining, at least in part, at least one target location 55. For example, the confinement apparatus 50 is configured to confine one or more qubits. In an example embodiment, the confinement apparatus 50 is an ion trap (e.g., a surface ion trap and/or a Paul trap) and the qubits are ions. In various embodiments, the confinement apparatus 50 comprises or is physically associated a dressing field circuit 70 that is operable to generate a dressing field at the target location 55.

In various embodiments, the dressing field circuit 70 is a circuit (e.g., a printed circuit) that is part of the confinement apparatus 50 (e.g., disposed and/or embedded in the same substrate and/or chip as the confinement apparatus 50) or disposed in physical proximity to the confinement apparatus 50 such that qubits disposed and/or confined at the target location 55 experience the dressing field when the dressing field circuit 70 is operated. For example, the dressing field circuit 70 is lithographically printed on the confinement apparatus 50, in an example embodiment. In various embodiments, the dressing field is a microwave field.

In various embodiments, the confinement apparatus 50 is configured to confine qubits in one or more confinement regions defined by the confinement apparatus 50. In various embodiments, a qubit is and/or is embodied as a neutral or charged atom; a neutral, charged, or multipole molecule; quantum particle; quantum dot; or other object that is able to be confined by the confinement apparatus and having an energy structure that is manipulatable via one or more dressing fields and gate microwave signals. For example, in an example embodiment, the confinement apparatus 50 is an ion trap (e.g., surface ion trap and/or Paul ion trap) and the qubits are ions with a non-zero nuclear spin.

In various embodiments, the QCCD-based quantum system 100 comprises a computing entity 10 and a quantum computer 110. In various embodiments, the quantum computer 110 comprises a controller 30 and a quantum processor 115. In various embodiments, the quantum processor 115 comprises a cryogenic and/or vacuum chamber 40 enclosing a confinement apparatus 50 and an associated dressing field circuit 70, and one or more manipulation sources (e.g., laser 60, microwave source 62). In an example embodiment, the one or more manipulation sources comprise one or more optical sources such as lasers 60, one or more microwave sources 62, and/or the like.

In various embodiments, the one or more lasers 60 are configured to generate and/or provide manipulation signals (e.g., optical beams) configured to manipulate and/or cause a controlled quantum state evolution of one or more quantum objects confined by the confinement apparatus 50. In various embodiments, the one or more microwave sources 62 are configured to generate and/or provide gate microwave signals configured to cause performance of single qubit gates on a target qubit that has a dressed and/or modified energy structure (e.g., an energy structure comprising a set of superposition states that includes a first dressed state and a second dressed state). For example, in an example embodiment, the one or more manipulation sources configured to provide manipulation signals (e.g., optical/laser beams in the case of lasers 60 and/or microwave gate signals in the case of microwave sources 62) to respective target locations defined at least in part by the confinement apparatus 50 within the cryogenic and/or vacuum chamber 40 via respective beam delivery systems 66 (e.g., 66A, 66B). In various embodiments, a beam delivery system 66 comprises one or more optical elements, photonic integrated circuits (PICs), optical fibers, free space optical elements, waveguides, and/or the like. In an example embodiment, the microwave source 62 is a circuit formed on a substrate housing the confinement apparatus 50 and/or on another substrate disposed within the cryogenic and/or vacuum chamber 40 and mounted to and/or secured in relation to the confinement apparatus 50. For example, in an example embodiment, a microwave source 62 is an integrated circuit configured for carrying GHz frequency alternating current (AC) currents.

In various embodiments, the quantum processor 115 further comprises a plurality of voltage and/or current sources 80. The voltage and/or current sources 80 are operable (e.g., by the controller 30) to generate and provide voltage signals or current signals to electrical elements (e.g., electrodes) of the confinement apparatus 50, one or more dressing field circuits 70, and/or the like.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the voltage and/or current sources 80, cryogenic system and/or vacuum system controlling the temperature and pressure within the cryogenic and/or vacuum chamber 40, manipulation sources (e.g., lasers 60, microwave sources 62, and/or the like), and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more qubits confined by the confinement apparatus 50.

FIG. 2 illustrates a top view of a portion of a confinement apparatus 50. The illustrated portion of the confinement apparatus 50 includes radio frequency (RF) rails 210A, 210B and three sequences of control electrodes 212A, 212B, 212C. Each sequence of control electrodes 212 comprises a plurality of control electrodes 214. For example, the illustrated portion of the sequence of control electrodes 212A includes control electrodes 214A, 214B, . . . , 214N.

In various embodiments, RF voltage sources of the voltage and/or current sources 80 generate and provide an RF voltage signal that is applied to the RF rails 210A, 210B to generate a pseudopotential that defines one or more linear confinement regions 200 of the confinement apparatus 50. The null point of the pseudopotential generated by the RF voltage signals being applied to the RF rails 210A, 210B defines the RF null axis 216 that extends substantially along a center line of the linear confinement region 200. The quantum objects confined by the confinement apparatus 50 are confined in the one or more linear confinement regions 200.

In various embodiments, the confinement apparatus 50 and the dressing field circuit 70 define a target location 55. When a qubit is confined by the confinement apparatus 50 within the target location 55 (and the dressing field circuit 70 is being operated to generate a dressing field), the qubit experiences a dressing field. In various embodiments, the dressing field is a microwave field (e.g., oscillates with a frequency in the range of 100 MHz to 500 GHz).

In various embodiments, the dressing field circuit 70 is a circuit (e.g., a printed circuit) that is part of the confinement apparatus 50 (e.g., disposed and/or embedded in the same substrate and/or chip as the confinement apparatus 50) or disposed in physical proximity to the confinement apparatus 50 such that qubits disposed and/or confined at the target location 55 experience the dressing field when the dressing field circuit 70 is operated. For example, the dressing field circuit 70 is lithographically printed on the confinement apparatus 50, in an example embodiment. In various embodiments, the controller 30 is configured to control operation of the dressing field circuit 70 by controlling operation of a voltage and/or current source 80 configured to provide a voltage signal and/or current signal to the dressing field circuit 70.

In various embodiments, the dressing field circuit 70 is configured to generate a dressing field that is a microwave field having a polarization that is in a plane that is perpendicular to quantization field of the confinement apparatus 50. In various embodiments, the quantization field is a substantially static magnetic field that is generally uniform across the confinement apparatus 50. In an example embodiment, the quantization field is into or out of the page of FIG. 2 and the polarization of the dressing field is in the plane of the page of FIG. 2.

In various embodiments, the dressing field circuit 70 is configured to generate a dressing field having a amplitude that decays significantly and/or quickly outside of the target location 55. For example, the dressing field circuit 70 is configured to generate a dressing field that decays and/or decreases outside of the target location 55 such that the dressing field only causes trackable AC Zeeman shifts on one or more additional qubits confined by the confinement apparatus and disposed outside of the target location. The trackable AC Zeeman shifts may be accounted for by the quantum system 100 such that they do not lead to errors or gate infidelity.

For example, a target qubit 5A disposed and/or confined at the target location 55 experiences a dressing field (e.g., while the dressing field circuit 70 is being operated) that causes the energy structure of the target qubit 5A to be modified and/or dressed to include a set of superposition states. An additional qubit 5B is disposed and/or confined outside of the target location 55. The additional qubit 5B has an energy structure that includes a set of initial sets. For example, the energy structure of the additional qubit 5B is not dressed and/or modified to include a set of superposition states. The additional qubit 5B may experience an AC Zeeman shift that is trackable and/or calculable. For example, the AC Zeeman shift experienced by the additional qubit 5B can be determined and tracked (e.g., by controller 30) such that the AC Zeeman shift experienced by the additional qubit 5B is tracked and/or accounted for by the quantum system 100. For example, the AC Zeeman shift experienced by the additional qubit 5B is tracked and/or accounted for such that the AC Zeeman shift experienced by the additional qubit 5B does not cause errors within a computation and/or controlled quantum state evolution performed by the quantum system 100.

The qubits confined by the confinement apparatus 50 may be transported between different locations of the confinement apparatus 50 through the application of sets of voltage signal sequences (e.g., generated by voltage and/or current sources 80) to the control electrodes 212. For example, the a qubit (or multiple qubits) may be transported into and/or out of a target location 55 and/or other locations defined by the confinement apparatus 50. For example, the controller 30 is configured to control the voltage and/or current sources 80 to cause performance of a transport operation on a qubit (or group of qubits) between various locations defined by the confinement apparatus 50.

In an example embodiment, the confinement apparatus 50 comprises and/or defines a single linear confinement region 200. In various embodiments, the confinement apparatus 50 comprises and/or defines a plurality and/or an array of linear confinement regions 200. For example, in an example embodiment, the confinement apparatus 50 comprises and/or defines a two-dimensional array of linear confinement regions 200.

Example Operation of a Quantum System to Perform a Single Qubit Gate

In various systems, a quantum system, such as the QCCD-based quantum system 100 is operable to perform a single qubit gate. In various embodiments, performing the single qubit gate includes modifying and/or dressing the energy structure of a target qubit by adiabatically applying a dressing field to the target qubit and applying a gate microwave signal to the target qubit that is tuned and/or resonant with a transition corresponding to the modified and/or dressed energy structure of the target qubit. For example, the gate microwave signal is characterized by a frequency that is tuned and/or resonant with a dressed frequency difference plus the hyperfine splitting of the qubit (e.g., the qubit frequency difference).

FIG. 3 illustrates at least a portion of a set of initial states 310 of a qubit. The set of initial states 310 includes a qubit sub-space 312 of the energy structure of the qubit. The qubit sub-space 312 includes a first qubit state 314A and a second qubit state 314B. The energy difference between the first qubit state 314A and the second qubit state 314B corresponds to a qubit frequency difference $\Delta f_q$. For example, the energy difference $\Delta E_q$ between the first qubit state 314A and the second qubit state 314B is equal to the qubit frequency difference $\Delta f_q$ multiplied by Planck's constant h (e.g., $\Delta E_q = h\,\Delta f_q$).

FIG. 3 also illustrates at least a portion of a set of superposition states 320. The set of superposition states 320 comprises at least two dressed states that are superpositions of respective states of the set of initial states 310. For example, a dressed state $\psi_d$ is formed by a combination and/or contributed to by multiple initial states $\psi_i$ of the set of initial states 310 (e.g., $\psi_d = \alpha^j \psi_i^j$ for coefficients $\alpha$ and initial states $\psi_i$ indexed by j and using Einstein summation notation).

The set of superposition states 320 includes a first dressed state 324A. The first dressed state 324A includes a non-zero contribution from the first qubit state 314A. For example, the coefficient $\alpha$ corresponding to the first qubit state 314A in a mathematical representation of the first dressed state 324A is non-zero. In an example embodiment, the first dressed state 324A does not include a contribution from the second qubit state 314B. For example, the coefficient $\alpha$ corresponding to the second qubit state 314B in a mathematical representation of the first dressed state 324A is zero.

The set of superposition states 320 further includes a second dressed state 324B. The second dressed state 324B includes a non-zero contribution from the second qubit state 314B. For example, the coefficient $\alpha$ corresponding to the second qubit state 314B in a mathematical representation of the second dressed state 324B is non-zero. In an example embodiment, the second dressed state 324B does not include a contribution from the first qubit state 314A. For example, the coefficient $\alpha$ corresponding to the first qubit state 314A in a mathematical representation of the second dressed state 324B is zero.

The energy difference between the first dressed state 324A and the second dressed state 324B corresponds to a dressed frequency difference $\Delta f_d$. For example, the energy difference $\Delta E_d$ between the first dressed state 324A and the second dressed state 324B is equal to the dressed frequency difference $\Delta f_d$ multiplied by Planck's constant h (e.g., $\Delta E_d = h\,\Delta f_d$).

The dressed frequency difference $\Delta f_d$ is different from the qubit frequency difference $\Delta f_q$. For example, the difference between the dressed frequency difference $\Delta f_d$ and the qubit frequency difference $\Delta f_q$ is in a range of 0.1 to 20 MHz, in various embodiments (e.g., 0.1 MHz$\leq|\Delta f_d - \Delta f_q|\leq$20 MHz). Thus, when the gate microwave signal characterized, tuned to, and/or resonant with the dressed frequency difference $\Delta f_d$ is incident on additional qubits 5B disposed and/or confined outside of the target location 55, the gate microwave signal is off resonant from the perspectives of the additional qubits 5B and the no undesired rotation of the additional qubits 5B is imparted by the gate microwave signal.

While FIG. 3 illustrates the set of initial states including F=1, m=+/−1, 0 and F=0, m=0, with the qubit sub-space including the F=1, m=0 and F=0, m=0 states, in various embodiments, the set of initial states includes F=2, m=+/−1, 0 and F=1, m=+/1, 0 states, with the qubit sub-space including the F=2, m=0 and F=1, m=0 states. In various embodiments, the set of initial states and the qubit sub-space are selected based at least in part on the initial energy structure of the quantum objects which are being used as the qubits of the quantum processor 115.

FIG. 4A provides a flowchart of processes, procedures, operations, and/or the like performed by a controller 30 of a quantum system 100 to perform a single qubit gate, in accordance with an example embodiment. In various embodiments, a single qubit gate is performed as part of performing a quantum circuit and/or algorithm, as part of initializing a qubit into a particular qubit state, and/or the like.

In various embodiments, the qubits 5 (e.g., 5A, 5B) confined by the confinement apparatus 50 can be transported between various locations defined by the confinement apparatus 50. For example, a qubit 5 can be transported into or out of a target location 55. In various embodiments, starting at step 402, the controller 30 causes a target qubit 5A for the single qubit gate to be located within the target location 55. For example, in an instance where the target qubit 5A is located outside of the target location 55, the controller 30 controls operation of one or more voltage and/or current sources 80 (e.g., via one or more driver controller elements 515, see FIG. 5) to cause the target qubit 5A to be transported into the target location 55. In an instance where the target qubit 5A is located within the target location 55, the controller 30 controls operation of one or more voltage and/or current sources (e.g., via one or more driver controller elements 515, see FIG. 5) to cause the target qubit 5A to continue to be located in the target location 55.

At step 404, while the target qubit 5A is disposed, located, and/or confined within the target location 55, the controller 30 controls operation of the dressing field circuit 70 to cause generation of a dressing field at the target location 55. For example, the controller 30 controls operation of one or more voltage and/or current sources 80 (e.g., via one or more driver controller elements 515) to cause the one or more voltage and/or current sources 80 to provide a voltage signal and/or current signal to the dressing field circuit 70 to cause the dressing field circuit to generate a dressing field. For example, in an example embodiment, the controller 30 controls operation of one or more voltage and/or current sources 80 (e.g., via one or more driver controller elements 515) to cause the one or more voltage and/or current sources 80 to provide an increasing (e.g., from zero amplitude toward a target non-zero amplitude) voltage signal and/or current signal to the dressing field circuit 70.

From the perspective of the target qubit 5A, the dressing field is turned on slowly such that the energy structure of the target qubit is dressed and/or modified from the set of initial states to the set of superposition states adiabatically. As used herein, the term "slowly" relates to the dressing field being turned on (for performance of the single qubit gate) at a time scale that is slow compared to the dressed frequency difference. For example, the time that elapses while the dressing field is turned on from a zero-amplitude to a dressing amplitude is longer than one over the dressed frequency difference (e.g., greater than the reciprocal of the dressed frequency difference).

For example, FIG. 4B provides a plot illustrating the evolution of the amplitude of the dressing field 420 with respect to time during performance of the single qubit gate. For example, at an initial time $t_0$ the amplitude of the dressing field is zero. During a turn on time period 422 extending from the initial time $t_0$ to a first time $t_1$ ($t_0<t_1$) the amplitude of the dressing field increases from zero to the dressing amplitude $A_d$. In the illustrated embodiment, the increase in amplitude of the dressing field is linear over the turn on time period 422. Various other functional forms may be used for increasing the amplitude of the dressing field in a monotonically increasing fashion starting at the initial time $t_0$ until the first time $t_1$.

In various embodiments, the turn on time period is longer than the reciprocal of the dressed frequency difference (e.g., $t_1-t_0>1/\Delta f_d$). The slow turn on and/or increase in amplitude of the dressing field causes the energy structure of the target qubit 5A to be dressed and/or modified adiabatically such that quantum information stored by the target qubit 5A is maintained (e.g., not destroyed) by the turning on of the dressing field.

At step 406, the controller 30 controls operation of the microwave source 62 to cause a gate microwave signal to be incident on the target location 55. For example, the controller 30 controls operation of the microwave source 62 (e.g., via one or more driver controller elements 515) to cause the gate microwave signal to be incident at the target location 55 starting at a second time $t_2$ ($t_1 \leq t_2$). The gate microwave signal 430 is incident on the target location with a gate amplitude $A_g$. In various embodiments, the gate amplitude $A_g$ of the gate microwave signal 430 is less than the dressing amplitude $A_d$ of the dressing field 420 during a gate time period 424. The controller 30 continues to control operation of the microwave source 62 to cause the gate microwave signal to be incident at the target location 55 until a third time $t_3$. For example, the controller 30 controls operation of the microwave source 62 such that the gate microwave signal 430 stopes being incident at the target location 55 at the third time $t_3$. The gate time (e.g., the time between the second time and the third time and having a temporal length of $t_3-t_2$) is a time that is appropriate for causing the gate microwave signal to interact with the target qubit 5A to cause the single qubit gate to be performed. For example, the gate time is a time that is appropriate for enabling the gate microwave signal to perform a rotation of the target qubit 5A corresponding to the single qubit gate.

In various embodiments, the amplitude of the gate microwave signal may be turned on and/or off slowly such that the amplitude of the gate microwave signal is ramped up and/or increased from zero amplitude to the gate amplitude $A_g$ and/or ramped down and/or decreased from the gate amplitude $A_g$ to zero amplitude. In various embodiments, the gate microwave signal is turned on at the gate amplitude (e.g., at the second time $t_2$) and then turned off (e.g., at the third time $t_3$). For example, in the embodiment illustrated in FIG. 4B, the amplitude of the gate microwave signal is a step function going from zero amplitude to the gate amplitude at the second time $t_2$ and a step function going from the gate amplitude to zero amplitude at the third time $t_3$.

In various embodiments, the wavelength and/or frequency of the gate microwave signal is resonant with the dressed frequency difference $\Delta f_d$ plus the hyperfine splitting of the qubit (e.g., plus the qubit frequency difference $\Delta f_q$). As the dressed frequency difference $\Delta f_d$ is different from the qubit frequency difference $\Delta f_q$ (e.g., $\Delta f_d \neq \Delta f_q$), the gate microwave signal is off resonant for additional qubits 5B located and/or disposed outside of the target location 55. In an example embodiment, the difference between the dressed frequency difference $\Delta f_d$ and the qubit frequency difference $\Delta f_q$ (e.g., $|\Delta f_d - \Delta f_q|$) is in a range of 0.1 to 20 MHz. Therefore, the gate microwave signal is off resonant for the one or more additional qubits 5B disposed and/or located outside of the target location 55 by 0.1 to 20 MHz, in an example embodiment, such that the gate microwave signal does not cause any undesired rotations of the one or more additional qubits 5B.

At step 408, the controller 30 controls operation of the dressing field circuit 70 to cause generation of a dressing field at the target location 55 to stop. For example, the controller 30 controls operation of one or more voltage and/or current sources 80 (e.g., via one or more driver controller elements 515) to cause the one or more voltage and/or current sources 80 to provide a voltage signal and/or current signal to the dressing field circuit 70 that causes the dressing field circuit 70 to stop generating the dressing field. For example, in an example embodiment, the controller 30 controls operation of one or more voltage and/or current sources 80 (e.g., via one or more driver controller elements 515) to cause the one or more voltage and/or current sources 80 to provide a decreasing (e.g., from a previous amplitude toward zero amplitude) voltage signal and/or current signal to the dressing field circuit 70.

From the perspective of the target qubit 5A, the dressing field is turned off slowly such that the energy structure of the target qubit is undressed and/or returned to the former energy structure adiabatically. For example, the energy structure of the target qubit is undressed and/or modified such that the set of superposition states are adiabatically returned to the set of initial states. As used herein, the term "slowly" relates to the dressing field being turned off (after performance of the single qubit gate) at a time scale that is slow compared to the dressed frequency difference $\Delta f_d$. For example, the time that elapses while the dressing field is turned off from the dressing amplitude $A_d$ to a zero amplitude is longer than one over the dressed frequency difference (e.g., greater than the reciprocal of the dressed frequency difference).

For example, at a fourth time $t_4$ ($t_3 \leq t_4$) the amplitude of the dressing field is the dressing amplitude $A_d$. During a turn off time period 426 extending from the fourth time $t_4$ to a fifth time $t_5$ ($t_4 < t_5$) the amplitude of the dressing field decreases from the dressing amplitude $A_d$ to zero. In the illustrated embodiment, the decrease in amplitude of the dressing field is linear over the turn off time period 426. Various other functional forms may be used for decreasing the amplitude of the dressing field in a monotonically decreasing fashion starting at the fourth time $t_4$ until the fifth time $t_5$.

In various embodiments, the turn off time period is longer than the reciprocal of the dressed frequency difference (e.g., $t_5 - t_4 > 1/\Delta f_d$). The slow turn off and/or decrease in amplitude of the dressing field causes the energy structure of the target qubit 5A to be undressed and/or modified adiabatically such that quantum information stored by the target qubit 5A is maintained (e.g., not destroyed) by the turning off of the dressing field.

At step 410, the controller 30 determines information regarding AC Zeeman shifts imparted to one or more additional qubits 5B located and/or disposed outside of the target location 55 as a result of the dressing field being generated at the target location 55 (e.g., between the initial time $t_0$ and the fifth time $t_5$). For example, while the amplitude of the dressing field decays quickly with distance from the target location 55, an additional qubit 5B located and/or disposed outside of the target location 55 may experience the dressing field at low amplitude/intensity. For example, the additional qubit 5B located and/or disposed outside of the target location 55 does not experience the dressing field at sufficiently high amplitude/intensity for the energy structure of the additional qubit 5B to be dressed and/or modified in the same manner as the target qubit 5A. In other words, the gate microwave signal is off resonant for the additional qubit 5B, even when the additional qubit 5B experiences the dressing field at low amplitude/intensity (e.g., compared to the dressing amplitude $A_d$).

The low amplitude/intensity dressing field experienced by the additional qubit 5B causes the additional qubit 5B to experience an AC Zeeman shift. An AC Zeeman shift is the magnetic counterpart or version of an AC Stark shift. In particular, the oscillating magnetic field of the dressing field interacting with the additional qubit 5B can change the speed or rate with which the additional qubit 5B accumulates phase. As such, a phase accumulator corresponding to the additional qubit 5B and stored in a classical memory (e.g., memory 510, see FIG. 5) of the controller 30 may be updated based on the AC Zeeman shift experienced by the additional qubit 5B.

For example, the classical memory 510 of the controller 30 may store a phase accumulator corresponding to each qubit confined by the confinement apparatus 50. The phase accumulator corresponding to a respective qubit may be periodically, regularly, and/or constantly updated or updated in a triggered manner to reflect the phase accumulated by the respective qubit. In various embodiments, the memory 510 stores executable instructions for calculating and/or determining information corresponding to an AC Zeeman shift experienced by a respective qubit based on the respective qubit's distance from the target location 55 (which controls the amplitude/intensity of the dressing field experienced by the respective qubit), the gate time or the time elapsed between the initial time and the fifth time (e.g., $t_5 - t_0$), and/or other information corresponding to the AC Zeeman shift experienced by the respective qubit. In an example embodiment, the memory 510 stores executable instructions for using the information regarding the AC Zeeman shift experienced by the respective qubit for updating the phase accumulator corresponding to the respective qubit. A processing device 505 of the controller 30 executes the executable instructions to cause the controller to determine information corresponding to respective AC Zeeman shifts imparted to one or more additional qubits, store the information corresponding to the respective AC Zeeman shifts imparted to the one or more additional qubits, update the phase accumulators corresponding to the one or more additional qubits based on the information corresponding to the respective AC Zeeman shifts imparted to the one or more additional qubits, and/or the like, in various embodiments.

In various embodiments, the phase accumulators corresponding to respective qubits may be used to perform one or more quantum error correction tasks corresponding to the respective qubits, adjust and/or control the phase of one or more laser beams caused to be incident on the respective qubits, and/or the like.

Technical Advantages

Conventionally, performance of a single qubit gate includes the application of one or more laser beams or microwaves on the qubit being gated. However, the laser beams can lead to photon scattering and/or introduce phase noise during the performance of a conventional single qubit gate, leading to reduced gate fidelity. Microwaves are not able to be focused on target qubits the way laser beams can, which can result in undesired rotations of qubits near the target qubit (e.g., crosstalk). In order to perform single qubit gates on qubits using microwaves (e.g., not using lasers), it is important to perform the gate in a manner that prevents crosstalk such that the single qubit gate only affects the target qubit(s). Various forms of frequency selection of qubits for performance of single qubit gates using microwaves have been proposed. However, these each have various technical challenges relating to scalability. Therefore, technical problems exist regarding how to perform single qubit gates that do not negatively impact qubits that are not the target qubit (e.g., that are not intended to be acted on by the single qubit gate).

Various embodiments provide technical solutions to these technical problems. In various embodiments, a dressing field is generated at a target location such that the energy structure of a target qubit located at the target location is modified and/or dressed by the dressing field. Prior to experiencing the dressing field, the energy structure of the target qubit includes a set of initial states including a first qubit state and a second qubit state. While experiencing the dressing field, the dressed energy structure of the target qubit includes a set of super position states. The set of superposition states includes a first dressed state that includes a non-zero contribution from the first qubit state and a second dressed state that includes a non-zero contribution from the second qubit state. The dressed frequency difference between the first dressed state and the second dressed state is different than the qubit frequency difference between the first qubit state and the second qubit state. The gate microwave signal used to perform the single qubit gate is tuned to and/or resonant with the dressed frequency difference. As a result, the gate microwave signal causes the single qubit gate to be performed on the target qubit and the gate microwave signal is off resonant to the qubits not located at the target location (e.g., since the dressed frequency difference is different from the qubit frequency difference. Thus, a single qubit gate is performed on the target qubit disposed at the target location and undesired rotations of qubits located outside of the target location are prevented. Therefore, various embodiments provide technical improvements to the fields of quantum computing, performance of single qubit gates, and controlled quantum state evolution of a qubit (e.g., a quantum object).

Example Controller

In various embodiments, a controller 30 is configured to control one or more components of a quantum system configured to perform single qubit gates (e.g., a quantum logic gate performed on a single qubit) without the use of lasers. For example, in various embodiments, a controller 30 is configured to control one or more components of a quantum system to cause the quantum system to perform single qubit gates using a (microwave) dressing field and a gate microwave signal.

For example, in various embodiments, a confinement apparatus 50 and an associated at least one dressing field circuit 70 that define, at least in part, at least one target location 55 are part of a QCCD-based quantum system 100. In various embodiments, the QCCD-based quantum system 100 comprises a controller 30 configured, for example, to control operation of various components of a quantum processor 115. For example, the controller 30 is configured to control the voltage and/or current sources 80 configured to provide voltage signals and/or current signals to the sequences of control electrodes 212 of the confinement apparatus 50 and/or the dressing field circuit 70. For example, the controller 30 is configured to control one or more microwave sources configured to generate and/or provide respective gate microwave signals. The controller 30 may be further configured to control a cryogenic system and/or vacuum system controlling the temperature and pressure within the cryogenic and/or vacuum chamber 40, manipulation sources (e.g., lasers 60), and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more qubits confined by the confinement apparatus 50.

As shown in FIG. 5, in various embodiments, the controller 30 may comprise various controller elements including processing device 505, memory 510, driver controller elements 515, a communication interface 520, analog-digital converter elements 525, and/or the like. For example, the processing device 505 may comprise processing elements, programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, controllers, and/or the like. The term circuitry may refer to an entirely hardware embodiment or a combination of hardware and computer program products. In an example embodiment, the processing device 505 of the controller 30 comprises a clock and/or is in communication with a clock. In various embodiments, the processing device 505 of the controller 30 is configured to execute executable instructions compiled in accordance with quantum assembly (QASM) and/or another quantum intermediate representation (QIR) compilation process.

For example, the memory 510 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 510 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language (s), and/or the like), and/or the like. In an example embodiment, execution of at least a portion of the computer program code stored in the memory 510 (e.g., by the processing device 505) causes the controller 30 to perform one or more steps, operations, processes, procedures and/or the like described herein for performing single qubit gates using a dressing field and a gate microwave signal (e.g., without use of a laser beam).

In various embodiments, the driver controller elements 515 may include one or more drivers and/or controller elements each configured to control one or more drivers. In various embodiments, the driver controller elements 515 may comprise drivers and/or driver controllers. For example, the driver controllers may be configured to cause one or more corresponding drivers to be operated in accordance with executable instructions, commands, and/or the like scheduled and executed by the controller 30 (e.g., by the processing device 505). In various embodiments, the driver controller elements 515 may enable the controller 30 to operate a manipulation source (e.g., laser 60 and/or microwave source 62) to provide an input optical beam or microwave signal, respectively, cause voltage and/or current sources 80 to provide respective voltage signals and/or current signals to respective control electrodes 214 and/or dressing field circuits, and/or the like. In various embodiments, the driver controller elements 515 enable the controller 30 to control and/or operate various drivers (e.g., laser drivers; microwave source drivers, AWGs, DACs, vacuum component drivers; cryogenic and/or vacuum system component drivers; and/or the like).

In various embodiments, the controller 30 comprises means for communicating and/or receiving signals from one or more optical receiver components and/or photodetectors such as cameras, MEMs cameras, CCD cameras, photodiodes, photomultiplier tubes, and/or the like. For example, the controller 30 may comprise one or more analog-digital converter elements 525 configured to receive signals from one or more optical receiver components, calibration sensors, and/or the like.

In various embodiments, the controller 30 may comprise a communication interface 520 for interfacing and/or communicating with a computing entity 10. For example, the controller 30 may comprise a communication interface 520 for receiving executable instructions, command sets, and/or the like from the computing entity 10 and providing output received from the quantum computer 110 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Example Computing Entity

FIG. 6 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110.

As shown in FIG. 6, a computing entity 10 can include an antenna 612, a transmitter 604 (e.g., radio), a receiver 606 (e.g., radio), and a processing device 608 that provides signals to and receives signals from the transmitter 604 and receiver 606, respectively. The signals provided to and received from the transmitter 604 and the receiver 606, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. In various embodiments, the computing entity 10 comprises a network interface 620 configured to enable communication between the computing entity 10 and the controller 30 and/or various other computing apparatuses. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 616 and/or speaker/speaker driver coupled to a processing device 608 and a touch screen, keyboard, mouse, and/or microphone coupled to a processing device 608). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 618 (hard or soft), a touch display, voice/speech or motion interfaces, scanners, readers, or other input device. In embodiments including a keypad 618, the keypad 618 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 622 and/or non-volatile storage or memory 624, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for performing a single qubit gate on a qubit confined by a confinement apparatus, the method comprising:

controlling, by a controller, operation of a dressing field circuit to cause the dressing field circuit to generate a dressing field at a target location defined at least in part by the confinement apparatus, wherein the dressing field is configured to modify an energy structure of the qubit disposed at the target location by causing a set of initial states of the qubit to form a set of superposition states, a first dressed state of the set of superposition states includes a non-zero contribution from a first qubit state of the set of initial states and a second dressed state of the set of superposition states includes a non-zero contribution from a second qubit state of the set of initial states, a dressed frequency difference between the first dressed state and the second dressed state is different from a qubit frequency difference between the first qubit state and the second qubit state;

controlling, by the controller, a microwave source to cause a gate microwave signal to be incident on the target location for a gate time, wherein the gate microwave signal is characterized by the dressed frequency difference plus the qubit frequency difference; and after completion of the gate time, controlling, by the controller, operation of the dressing field circuit to cause the dressing field circuit to stop generating the dressing field at the target location, wherein operation of the dressing field circuit is controlled such that the dressing field is turned on and turned off adiabatically.

2. The method of claim 1, wherein the operation of the dressing field circuit is controlled such that when the dressing field circuit starts generating the dressing field, an amplitude of the dressing field increases from zero to a dressing amplitude over a time period that is longer than a reciprocal of the dressed frequency difference.

3. The method of claim 1, wherein the operation of the dressing field circuit is controlled such that when the dressing field circuit stops generating the dressing field, an amplitude of the dressing field decreases from a dressing amplitude to zero over a time period that is longer than a reciprocal of the dressed frequency difference.

4. The method of claim 1, wherein controlling operation of the dressing field circuit comprises controlling operation of a current source or voltage source configured to provide a respective one of current or voltage to the dressing field circuit.

5. The method of claim 1, wherein the dressing field is a microwave field.

6. The method of claim 1, wherein the dressing field circuit is disposed on the confinement apparatus.

7. The method of claim 6, wherein the dressing field circuit is lithographically printed on a surface of the confinement apparatus.

8. The method of claim 1, wherein a frequency difference between the dressed frequency difference and the qubit frequency difference is in a range of 0.1 to 20 MHz.

9. The method of claim 1, wherein the dressing field is configured to only cause trackable AC Zeeman shifts on one or more additional qubits confined by the confinement apparatus and disposed outside of the target location.

10. The method of claim 9, further comprising storing, to a classical memory of the controller, information regarding an AC Zeeman shift imparted to the one or more additional qubits by the dressing field.

11. The method of claim 1, wherein (a) the gate microwave signal is incident on the target location with a gate amplitude, (b) while the gate microwave signal is incident on the target location, the dressing field has a dressing amplitude, and (c) the dressing amplitude is larger than the gate amplitude.

12. A system configured to perform a single qubit gate on a qubit, the system comprising:

a confinement apparatus configured to confine one or more qubits;

a dressing field circuit, the dressing field circuit and the confinement apparatus defining, at least in part, a target location;

a microwave source configured to generate a gate microwave signal; and a controller configured to control operation of the dressing field circuit and the microwave source, the controller configured to control operation of the dressing field circuit and the microwave source to cause the single qubit gate to be performed on the qubit located at the target location by performing:

controlling operation of the dressing field circuit to cause the dressing field circuit to generate a dressing field at the target location, wherein the dressing field is configured to modify an energy structure of the qubit of the one or more qubits, the qubit disposed at the target location by causing a set of initial states of the qubit to form a set of superposition states, a first dressed state of the set of superposition states includes a non-zero contribution from a first qubit state of the set of initial states and a second dressed state of the set of superposition states includes a non-zero contribution from a second qubit state of the set of initial states, a dressed frequency difference between the first dressed state and the second dressed state is different from a qubit frequency difference between the first qubit state and the second qubit state, controlling the microwave source to cause the gate microwave signal to be incident on the target location for a gate time, wherein the gate microwave signal is characterized by the dressed frequency difference plus the qubit frequency difference, and after completion of the gate time, controlling operation of the dressing field circuit to cause the dressing field circuit to stop generating the dressing field at the target location, wherein operation of the dressing field circuit is controlled such that the dressing field is turned on and turned off adiabatically.

13. The system of claim 12, wherein operation of the dressing field circuit is controlled such that when the dressing field circuit starts generating the dressing field, an amplitude of the dressing field increases from zero to a dressing amplitude over a time period that is longer than a reciprocal of the dressed frequency difference and, when the dressing field circuit stops generating the dressing field, the amplitude of the dressing field decreases from the dressing amplitude to zero over the time period that is longer than the reciprocal of the dressed frequency difference.

14. The system of claim 12, wherein controlling operation of the dressing field circuit comprises controlling operation of a current source or voltage source configured to provide a respective one of current or voltage to the dressing field circuit to cause the dressing field circuit to generate the dressing field and the dressing field is a microwave field.

15. The system of claim 12, wherein the dressing field circuit is disposed on the confinement apparatus.

16. The system of claim 15, wherein the dressing field circuit is lithographically printed on a surface of the confinement apparatus.

17. The system of claim 12, wherein the dressing field is configured to only cause trackable AC Zeeman shifts on one or more additional qubits confined by the confinement apparatus and disposed outside of the target location and the controller is further configured to store to a classical memory of the controller, information regarding an AC Zeeman shift imparted to the one or more additional qubits by the dressing field.

18. The system of claim 12, wherein (a) the gate microwave signal is incident on the target location with a gate amplitude, (b) while the gate microwave signal is incident on the target location, the dressing field has a dressing amplitude, and (c) the dressing amplitude is larger than the gate amplitude.

19. A controller configured to control one or more components of a quantum system and configured to cause the quantum system to perform a geometric phase gate, the controller comprises a processing device, memory storing executable instructions, and driver controller elements, the executable instructions are configured to, when executed by the processing device, cause the controller to use the driver controller elements to:

control operation of a dressing field circuit to cause the dressing field circuit to generate a dressing field at a target location defined at least in part by a confinement apparatus of the quantum system, wherein the dressing field is configured to modify an energy structure of a qubit disposed at the target location by causing a set of initial states of the qubit to form a set of superposition states, a first dressed state of the set of superposition states includes a non-zero contribution from a first qubit state of the set of initial states and a second dressed state of the set of superposition states includes a non-zero contribution from a second qubit state of the set of initial states, a dressed frequency difference between the first dressed state and the second dressed state is different from a qubit frequency difference between the first qubit state and the second qubit state;

control operation of a microwave source to cause a gate microwave signal to be incident on the target location for a gate time, wherein the gate microwave signal is characterized by the dressed frequency difference plus the qubit frequency difference; and after completion of the gate time, control operation of the dressing field circuit to cause the dressing field circuit to stop generating the dressing field at the target location.

20. The controller of claim 19, wherein the dressing field is configured to only cause trackable AC Zeeman shifts on one or more additional qubits confined by the confinement apparatus and disposed outside of the target location, and the executable instructions are further configured to, when executed by the processing device, cause the controller to store, to the memory, information regarding an AC Zeeman shift imparted to the one or more additional qubits by the dressing field.

* * * * *